Aug. 12, 1924.
F. B. THOMAS
1,504,396
FLUID PRESSURE BRAKE
Filed Sept. 22, 1923
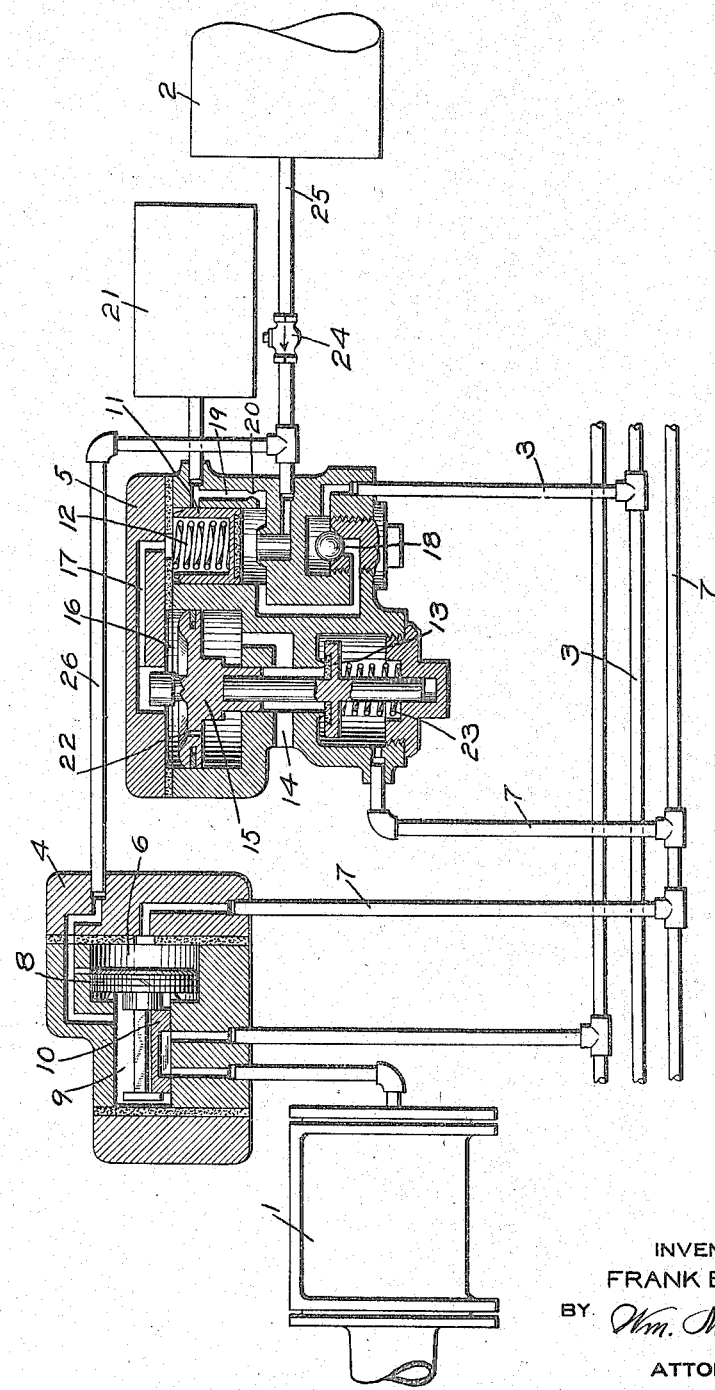
INVENTOR
FRANK B. THOMAS
BY Wm. M. Cady
ATTORNEY Patented Aug. 12, 1924.

1,504,396

UNITED STATES PATENT OFFICE.

FRANK B. THOMAS, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed September 22, 1923. Serial No. 664,230.

*To all whom it may concern:*

Be it known that I, FRANK B. THOMAS, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes.

It has heretofore been proposed to provide means for cutting off communication from the main reservoir to the main reservoir pipe line so as to prevent loss of main reservoir pressure in case the main reservoir pipe should become broken and at the same time means have been provided for effecting an application of the brakes when said communication is cut off.

The principal object of my invention is to provide an improved main reservoir cut off valve device of the above character.

In the accompanying drawing, the single figure is a diagrammatic view, partly in section, of a fluid pressure brake equipment, showing my improved valve device applied thereto.

As shown in the drawing, the equipment may comprise a brake cylinder 1, a main reservoir 2, a main reservoir pipe 3, an emergency valve device 4, and a main reservoir cut-off valve device 5.

The emergency valve device 4 may be of the usual construction comprising a casing having a valve chamber 6, connected to the emergency brake pipe 7 and containing piston 8 and valve chamber 9, connected to the main reservoir 2 and containing slide valve 10 adapted to be operated by piston 8.

The main reservoir cut-off valve device 5 may comprise a casing containing a valve piston 11 for controlling communication from the main reservoir 2 to the main reservoir pipe line 3 and subject to the pressure of a spring 12.

For controlling the venting of fluid from the brake pipe 7 to effect an emergency application of the brakes when the cut-off valve piston 11 is operated, a valve 13 is provided which controls communication from brake pipe 7 to an atmospheric vent port 14. A piston 15, contained in piston chamber 16, is operatively connected to valve 13, and a passage 17 connects piston chamber 16 with the spring side of valve piston 11.

In operation, when the main reservoir 2 is being charged with fluid pressure, as soon as the pressure has been raised to a predetermined degree, the valve piston 11 will be lifted from its lower seat, against the resistance of spring 12, so as to open communication from the main reservoir 2 to the main reservoir pipe 3 and fluid then flows from the main reservoir past the check valve 18 to the main reservoir pipe 3. With the valve piston 11 in its upper seated position, as shown in the drawing, communication is opened through a passage 19 containing a restricted section 20 to a reservoir 21, so that said reservoir is charged with fluid under pressure. With passage 17 cut off from reservoir 21 by the upper seating of valve piston 11, fluid pressure in piston chamber 16 escapes through a restricted port 22 in piston 15 to exhaust port 14 and opposite sides of piston 15 being then at atmospheric pressure, the spring 23 maintains valve 13 in its closed position.

If the pressure in the main reservoir or the main reservoir pipe 3 should fall below a predetermined degree, as may be occasioned by a rupture of the pipe 3, the valve piston 11 will be shifted by spring 12 to its lower seat, cutting off communication from the main reservoir 2 to the main reservoir pipe 3, and at the same time opening communication from the previously charged reservoir 21 through passage 17 to piston chamber 16. The piston 15 is then shifted downwardly to open the vent valve 13, so that fluid is vented from the brake pipe 7 to the exhaust port 14. The reduction in pressure thus produced in the brake pipe 7 causes the movement of the emergency piston 8 to its outer position, in which the valve 10 opens communication from the valve chamber 9 and the main reservoir 2 to the brake cylinder 1. An emergency application of the brakes is then effected.

With the valve piston 11 in its lower seated position, communication from the main reservoir through passage 19 to reservoir 21 is cut off, and the fluid pressure in said reservoir gradually escapes through passage 17 and through the restricted port 22 in piston 15 to the exhaust port 14.

When the pressures on opposite sides of piston 15 have substantially equalized, the spring 23 will operate to close valve 13 and thus cut off communication from the brake pipe 7 to the exhaust port 14.

The restricted section 20 of passage 19 functions to retard the escape of fluid from reservoir 21 when fluid is escaping from the main reservoir pipe due to breakage or the like.

A check valve 24 may be interposed in pipe 25 which connects the main reservoir 2 with the valve piston 11, so that brake cylinder pressure will not be lost in case the emergency piston 8 is in emergency position, connecting the brake cylinder through valve chamber 9 and pipe 26 with the main reservoir, and the main reservoir pressure should for any reason fall below the pressure in the brake cylinder.

Having now described my invention, what I claim as new and desire to secure by Letters Patent, is:—

1. In a fluid pressure brake, the combination with a source of fluid under pressure and a brake pipe, of a valve device operated by fluid under pressure for venting fluid from the brake pipe and means operated upon a predetermined reduction in pressure of said source of fluid pressure for supplying fluid to said valve device.

2. In a fluid pressure brake, the combination with a main reservoir, a main reservoir supply pipe and a brake pipe, of a valve device operated by fluid pressure for venting fluid from the brake pipe to effect an application of the brakes and valve means operated upon a predetermined reduction in pressure in said main reservoir pipe for cutting off communication from said reservoir to said reservoir supply pipe and for supplying fluid to said valve device.

3. In a fluid pressure brake, the combination with a main reservoir, a main reservoir supply pipe and a brake pipe, of a valve device operated by fluid pressure for venting fluid from the brake pipe to effect an application of the brakes, an additional reservoir normally charged with fluid under pressure, and valve means operated upon a predetermined reduction in pressure in said main reservoir pipe for cutting off communication from said main reservoir to the main reservoir pipe and for supplying fluid from said additional reservoir to said valve device.

4. In a fluid pressure brake, the combination with a main reservoir, a main reservoir supply pipe and a brake pipe, of a valve device operated by fluid pressure for venting fluid from the brake pipe to effect an application of the brakes, an additional reservoir normally charged with fluid under pressure, valve means operated upon a predetermined reduction in pressure in said main reservoir pipe for supplying fluid from said additional reservoir to said valve device, and means for gradually reducing the pressure in said additional reservoir in the open position of said valve means.

In testimony whereof I have hereunto set my hand.

FRANK B. THOMAS.